(12) United States Patent
Becher et al.

(10) Patent No.: US 6,920,126 B2
(45) Date of Patent: Jul. 19, 2005

(54) METHOD FOR ROUTING LINKS THROUGH A PACKET-ORIENTED COMMUNICATION NETWORK

(75) Inventors: Reinhard Becher, München (DE); Jan Kreppel, Penzberg (DE); Klaus Nimphius, Falkensee (DE)

(73) Assignee: Siemens Aktiengesellschaft, Munich (DE)

( * ) Notice: Subject to any disclaimer, the term of this patent is extended or adjusted under 35 U.S.C. 154(b) by 841 days.

(21) Appl. No.: 09/789,785

(22) Filed: Feb. 20, 2001

(65) Prior Publication Data

US 2001/0028641 A1 Oct. 11, 2001

Related U.S. Application Data (63) Continuation of application No. PCT/DE99/02607, filed on Aug. 19, 1999.

(30) Foreign Application Priority Data

Aug. 19, 1998 (DE) .......................................... 198 37 641

(51) Int. Cl.[7] .................................................. H04Q 7/24
(52) U.S. Cl. ........................ 370/338; 370/352; 455/435
(58) Field of Search ................................ 370/338, 349, 370/466, 467, 389, 392, 352, 353, 354, 355, 410, 400, 401, 331, 328, 356; 455/432, 422, 435, 436, 445

(56) References Cited

U.S. PATENT DOCUMENTS

| | | | |
|---|---|---|---|
| 5,793,762 A | | 8/1998 | Penners et al. |
| 5,862,481 A | * | 1/1999 | Kulkarni et al. .......... 455/432.2 |
| 6,198,933 B1 | * | 3/2001 | Lundin .................... 455/456.4 |
| 6,311,055 B1 | * | 10/2001 | Boltz ....................... 455/414.1 |
| 6,321,257 B1 | * | 11/2001 | Kotola et al. ................ 709/219 |
| 6,411,632 B2 | * | 6/2002 | Lindgren et al. ........... 370/466 |
| 6,421,339 B1 | * | 7/2002 | Thomas ..................... 370/352 |
| 6,519,252 B2 | * | 2/2003 | Sallberg .................... 370/356 |
| 6,608,832 B2 | * | 8/2003 | Forslow .................... 370/353 |
| 6,622,016 B1 | * | 9/2003 | Sladek et al. ............ 455/414.1 |
| 6,839,421 B2 | * | 1/2005 | Ferraro Esparza et al. ...... 379/220.01 |
| 6,857,021 B1 | * | 2/2005 | Schuster et al. ............ 709/227 |

FOREIGN PATENT DOCUMENTS

DE  19832290 A1  1/2000

OTHER PUBLICATIONS

Published International Application No. 98/03028 (Berggren et al.), dated Jan. 22, 1998.
Published International Application No. 99/33250 (Andersson et al.), dated Jul. 1, 1999.

* cited by examiner

Primary Examiner—Ajit Patel
Assistant Examiner—Andrew C Lee
(74) Attorney, Agent, or Firm—Laurence A. Greenberg; Werner H. Stemer; Ralph E. Locher

(57) ABSTRACT

A packet-oriented communication network is provided having one or more domains which in each case includes at least one network facility, and a mobile radio network which includes at least one home location register and uses a signaling protocol. The network facility of the packet-oriented communication network supports the signaling protocol for interworking with the home location register of the mobile radio network. Using the signaling protocol, an inquiry as to whether the routing of the link is to be performed in the packet-oriented communication network or in the mobile radio network is directed by the network facility from the packet-oriented communication network to the home location register of the mobile radio network.

16 Claims, 3 Drawing Sheets

METHOD FOR ROUTING LINKS THROUGH A PACKET-ORIENTED COMMUNICATION NETWORK

CROSS-REFERENCE TO RELATED APPLICATION

This application is a continuation of copending International Application No. PCT/DE99/02607, filed Aug. 19, 1999, which designated the United States.

BACKGROUND OF THE INVENTION

Field of the Invention

The invention relates to a method for routing links through a packet-oriented communication network, in which the packet-oriented network exhibits one or more domains including in each case at least one network facility for administering communication terminals in the domain and for communicating with a mobile radio network, and the mobile radio network exhibits at least one home location register for administering mobile stations of mobile subscribers and uses a signaling protocol for the communication between network facilities of the mobile radio network.

It is known that a mobile radio network—for example that according to the GSM (Global System for Mobile Communication) standard—exhibits one or more home location registers for administering mobile stations of mobile subscribers, of which at least one central database contains the subscriber data and service data continuously during the period of registration in the network, whereas decentralized databases distributed to radio zones of the mobile radio network temporarily store the subscriber data and service data only for the period of the stay in the respective radio zone. A signaling protocol which, for example, consists of a signaling method according to the common channel signaling system No 7 (CCS7) is used for the communication between the network facilities of the mobile radio network.

Interworking and interconnection of mobile radio networks with other telecommunication networks is increasingly being discussed. This increases the significance of the routing of links through alternative networks, for example through packet-oriented networks such as the Internet and its associated Internet protocol (IP).

The following link configurations must be controlled for supporting the link treatment:

IP network to IP network;

Mobile radio network to IP network;

IP network to mobile radio network; and

Mobile radio network to mobile radio network via IP network as transit network.

The ITU Standard H.323 (visual telephone systems and equipment for local area networks which provide a non guaranteed quality of service) has gained acceptance as a basis for the communication links in IP networks. In this standard, domains are defined in which network facilities (gateway, gatekeeper) are in each case arranged for administering the communication terminals in the respective domain and for communicating with other telecommunication networks such as, for example, a mobile radio network.

When interworking between different networks, it is generally desirable to design the respective network functions to be as orthogonal as possible, i.e. to keep the knowledge of a network about the other network at a minimum in order to avoid dependencies and bypass complicated adaptations.

U.S. Pat. No. 5,793,762 discloses supporting an Internet access to an Internet packet data network (IPDN) in a mobile station and a mobile radio network independently of elements relating to conventional voice functions. Internet data is transmitted between the mobile radio network and the Internet via an Internet access node, and handover functions are provided for Internet data and conventional voice data.

SUMMARY OF THE INVENTION

It is accordingly an object of the invention to provide a method for routing links which overcomes the above-mentioned disadvantages of the prior art apparatus and methods of this general type. In particular, it is an object to provide a method for routing links such that the optimum possible interworking between a packet-oriented network and a mobile radio network is achieved and so that the knowledge about the mobile radio network remains at a minimum from the point of view of the packet-oriented network.

With the foregoing and other objects in view there is provided, in accordance with the invention a method for routing links through a packet-oriented communication network, and for communicating with a mobile radio network that includes providing a mobile radio network that includes at least one home location register for administering mobile stations of mobile subscribers and that uses a signaling protocol for communication between network facilities of the mobile radio network. A packet-oriented communication network is provided that includes at least one domain having at least one network facility for administering communication terminals in the at least one domain. The at least one network facility of the packet-oriented communication network supports the signaling protocol for interworking with the home location register of the mobile radio network. With the network facility of the packet-oriented communication network, the signaling protocol is used to direct an inquiry to the home location register of the mobile radio network as to whether a routing of a link is to be performed in the packet-oriented communication network or in the mobile radio network.

In other words, the invention is based on a packet-oriented communication network having one or more domains which in each case exhibit at least one network facility, and a mobile radio network which exhibits at least one home location register and uses a signaling protocol. The network facility of the packet-oriented communication network supports the signaling protocol for interworking with the home location register of the mobile radio network and an inquiry is directed by the network facility from the packet-oriented communication network to the home location register of the mobile radio network by using the signaling protocol. The inquiry is whether the routing of the link is to be performed in the packet-oriented communication network or in the mobile radio network. The subject matter of the invention provides for interrogating the home location register in the mobile radio network directly from the packet-oriented communication network without requiring elaborate adaptations. The knowledge about the mobile radio network and its mobile radio-related functions and facilities remains at a minimum which avoids any dependence. Combining the interworking of different networks with a decision about the type of routing—either in one network or in the other network—leads to more flexibility in setting up the link and in the charging of the links set up both for the mobile subscribers of the mobile radio network and for the stationary subscribers of the packet-oriented communication network.

In accordance with an added feature of the invention, the inquiry is answered by the home location register by sending back at least one information item to the packet-oriented communication network. The network facility uses the information item to decide that the routing of the link will be performed in the packet-oriented communication network. This has the advantage that only one information item is sufficient for making the decision about the type of routing—namely in the packet-oriented communication network.

In accordance with an additional feature of the invention, this information item preferably consists of a mobile subscriber roaming number issued for the mobile station of the mobile subscriber. This mobile subscriber roaming number is sent back after the routing of the link in the packet-oriented communication network from a domain into the mobile radio network and is used for setting up the connection to the mobile station. Using the mobile subscriber roaming number which is normally only used in the mobile radio network provides, on the one hand, for simple evaluation and recognition of the type of routing, and on the other hand, for the direct provision of routing information for the final link set-up in the mobile radio network in dependence on the current location of the mobile subscriber, or respectively, his mobile station.

In accordance with another feature of the invention, the inquiry is answered by the home location register by sending back at least one information item to the packet-oriented communication network. The network facility uses the information item to decide that the routing of the link will be carried out in the mobile radio network. This also has the advantage that even one information item is sufficient for making the decision on the type of routing—namely in the mobile radio network. This information item preferably consists of a mobile radio network-related information item or an error flag, which have the advantage of simple evaluation and recognition of the routing.

In accordance with a further feature of the invention, the home location register decides, on the basis of the inquiry, whether the routing of the link is to be performed in the packet-oriented communication network or in the mobile radio network. The home location register answers the inquiry by sending back at least one information item to the packet-oriented communication network which signals the decision to the network facility. The decision is thus made in the mobile radio network and the packet-oriented communication network only needs to be informed of the result of the decision.

In accordance with a further added feature of the invention, a check is performed in the mobile radio network as to whether the routing of the link within the packet-oriented communication network between a home domain and a visited domain is allowed. This additional check provides the advantage of a general interrogation whether routing in the packet-oriented communication network is allowed for the moving mobile subscriber which leads to a final routing of the link into a radio zone which, for example, differs from its home mobile network. Routing into this radio zone through the packet-oriented communication network can be more disadvantageous, especially with regard to the charging for the link, than routing between the home mobile radio network and the radio zone.

In accordance with a further additional feature of the invention, the home location register sends an operator information item regarding the operator of a home domain to a further visited location register which belongs to a radio zone of the mobile radio network that is currently covering the mobile station. This further home location register evaluates operator information on operators of visited domains which in each case provide access from the packet-oriented communication network to the radio zone of the mobile radio network, and evaluates the received operator information of the home domain for further control of the routing of the link.

In accordance with a concomitant feature of the invention, the further visited location register stores the operator information on operators of visited domains and provides it to the home location register which receives the inquiry from the packet-oriented communication network. This operator information is then evaluated for further control of the routing of the link in the mobile radio network or in the packet-oriented communication network.

Other features which are considered as characteristic for the invention are set forth in the appended claims.

Although the invention is illustrated and described herein as embodied in a method for routing links through a packet-oriented communication network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
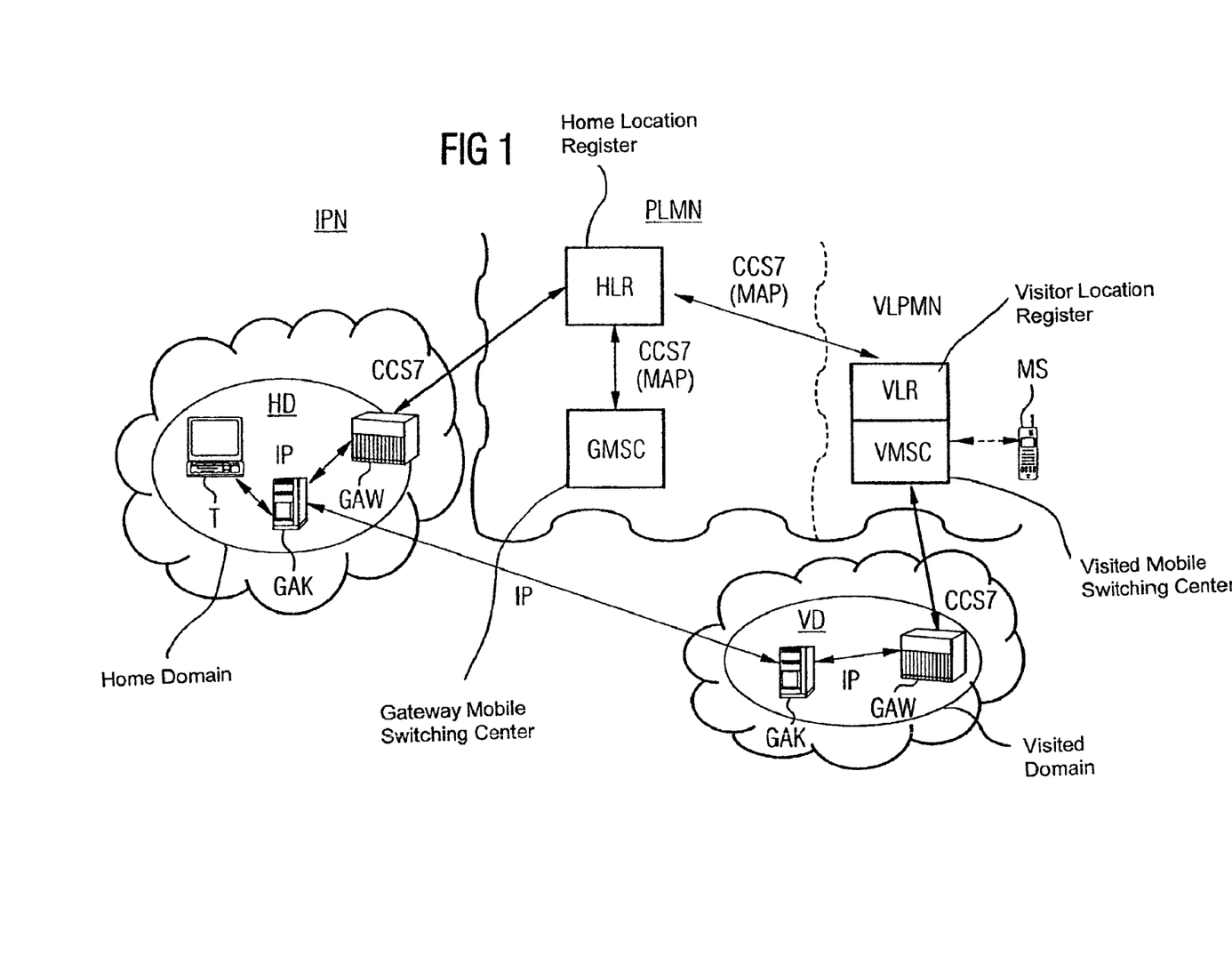
FIG. 1 shows the interworking between facilities of a mobile radio network and a packet-oriented communication network for routing links.

Referring now to the figures of the drawing in detail and first, particularly, to FIG. 1 thereof, there is shown the network facilities of a mobile radio network PLMN, using for example, the GSM standard, and the network facilities of a packet-oriented communication network IPN, using for example, the H.323 standard, between which interworking can take place for routing links in accordance with the invention. The invention is not restricted to the networks specified by way of example and its facilities nor is it restricted to the standards mentioned. In the example shown, a link configuration is assumed in such a manner that a link from a stationary subscriber in the communication network IPN is initiated by a communication terminal T and is to be routed to a mobile station MS of a mobile subscriber of the mobile radio network PLMN. Similarly, other scenarios are conceivable—such as, for example, routing links from a mobile station MS of the mobile radio network PLMN to a communication terminal T of the communication network IPN or between two mobile stations MS using the communication network IPN as a transit network, for which the interworking is analogously applied in accordance with the invention.

According to the known network architecture of a mobile radio network, the mobile station MS, as a communication terminal of the mobile subscriber, is connected wirelessly via an air interface to a base station system with stationary base stations and base station controllers. The base station system is connected to a switching system, the essential network facilities for routing links of which are shown in FIG. 1. Thus, the switching system has at least one home location register (HLR) which is arranged as a central facility for administering all mobile subscribers registered in the network and continuously stores their subscriber data and service data for the period of their registration. In addition, the switching system has one or more visitor location registers (VLR) which in each case are arranged as a decentralized facility for administering the mobile subscribers currently located and registered in a radio zone and for temporarily storing their subscriber data and service data for the period of their stay.

In the example it is assumed that the current location of the mobile station MS, the mobile subscriber of which is usually located in his home mobile radio network PLMN, is in a visited public land mobile network (VPLMN). Independently of the location of the mobile subscriber in a radio zone of the home mobile radio network PLMN or the visited mobile radio network VPLMN, he is administered by a visitor location register VLR responsible for him and served by an associated mobile switching center. This mobile switching center handles switching functions including the routing and the setting up of the link for the subscribers or mobile stations located in its coverage area. In the example, the visited mobile switching center (VMSC) serves the mobile station MS involved in setting up the link.

The home location register HLR is connected to a gateway mobile switching center (GMSC) which forms the interface between a mobile radio network PLMN and other telecommunication networks and routes incoming links. In addition, the home location register HLR is coupled to the other visitor location registers VLR for exchanging data, messages and signaling information. Communication among the network facilities of the mobile radio network is made possible by a signaling protocol CCS7 (Common Channel Signaling System No. 7) which includes a mobile application part (MAP).

The ITU standard H.323 has become accepted as a basis for the communication links in the communication network IPN. The network facilities, therefore, exchange data, messages and signaling information via a corresponding communication protocol IP (Internet Protocol). According to H.323, domains are defined for the communication network IPN, of which a home domain HD and a visited domain VD, which are arranged spatially separate from one another, are shown by way of example. The home domain HD and the visited domain VD can also coincide in a single domain. In each domain HD, VD, a gateway (GAW) network facility and a gatekeeper (GAK) network facility are arranged which are connected to one another. The gatekeeper network facility GAK handles the administration and monitoring of the terminals T registered in the respective HD, VD domain—comparable to the function of the home location register HLR in the mobile radio network. The gateway network facility GAW handles the functions necessary for communication with another telecommunication network— with the mobile radio network in the example—, such as, for example, the translation of the information from internal communication to external communication, sending and receiving the information and messages etc. In the example, the two network facilities GAW, GAK are constructed as separate facilities, but they can also be integrated in a single facility having both functionalities. According to the subject matter of the invention, the gatekeeper network facility GAW—in conjunction with the gateway network facility GAW—of the communication network IPN supports the signaling protocol CCS7 for interworking with the home location register HLR of the mobile radio network PLMN and an interrogation is directed from the communication network IPN to the home location register HLR of the mobile radio network PLMN using the signaling protocol CCS7. The purpose of this interrogation is to bring about a decision as to whether the routing of the link is carried out in the communication network IP or in the mobile radio network PLMN. As a result, the home location register HLR in the mobile radio network PLMN can be directly interrogated from the packet-oriented communication network IPN without needing elaborate adaptations for this purpose. The knowledge about the mobile radio network and its mobile radio-oriented functions and facilities remains at a minimum which avoids any dependence. Combining the interworking of different networks with a decision on the type of routing—either in the one network IP or in the other network PLMN—leads to more flexibility in the setting up of the link and in the charging for the links set up, both for the mobile subscribers of the mobile radio network PLMN and for the stationary subscribers of the communication network IPN.

In the present example, if routing through the communication network IPN is allowed, first the connection between the home domain HD and the visited domain VD is set up in accordance with the IP signaling protocol and is then routed from the visited domain VD into the radio zone of the mobile station MS, for example, to the visited mobile switching center VMSC of the visited mobile radio network VPLMN, in accordance with the CCS7 signaling protocol. During this process, the home location register HLR transmits a mobile subscriber roaming number (MSRN, see FIG. 2) which is used for the final setting up of the connection in the mobile radio network. In this process, the signaling protocol CCS7 includes a user part ISUP (ISDN user part) or a signaling system DSS.1 (Digital Subscriber Signaling System No. 1). The invention makes it possible to interrogate the home location register HLR of the home mobile radio network PLMN directly from the IP network and to use the received mobile subscriber roaming number for setting up the link into the visited mobile radio network VPLMN without having to implement further mobile radio-oriented functions in the IP network.

Figure 2:
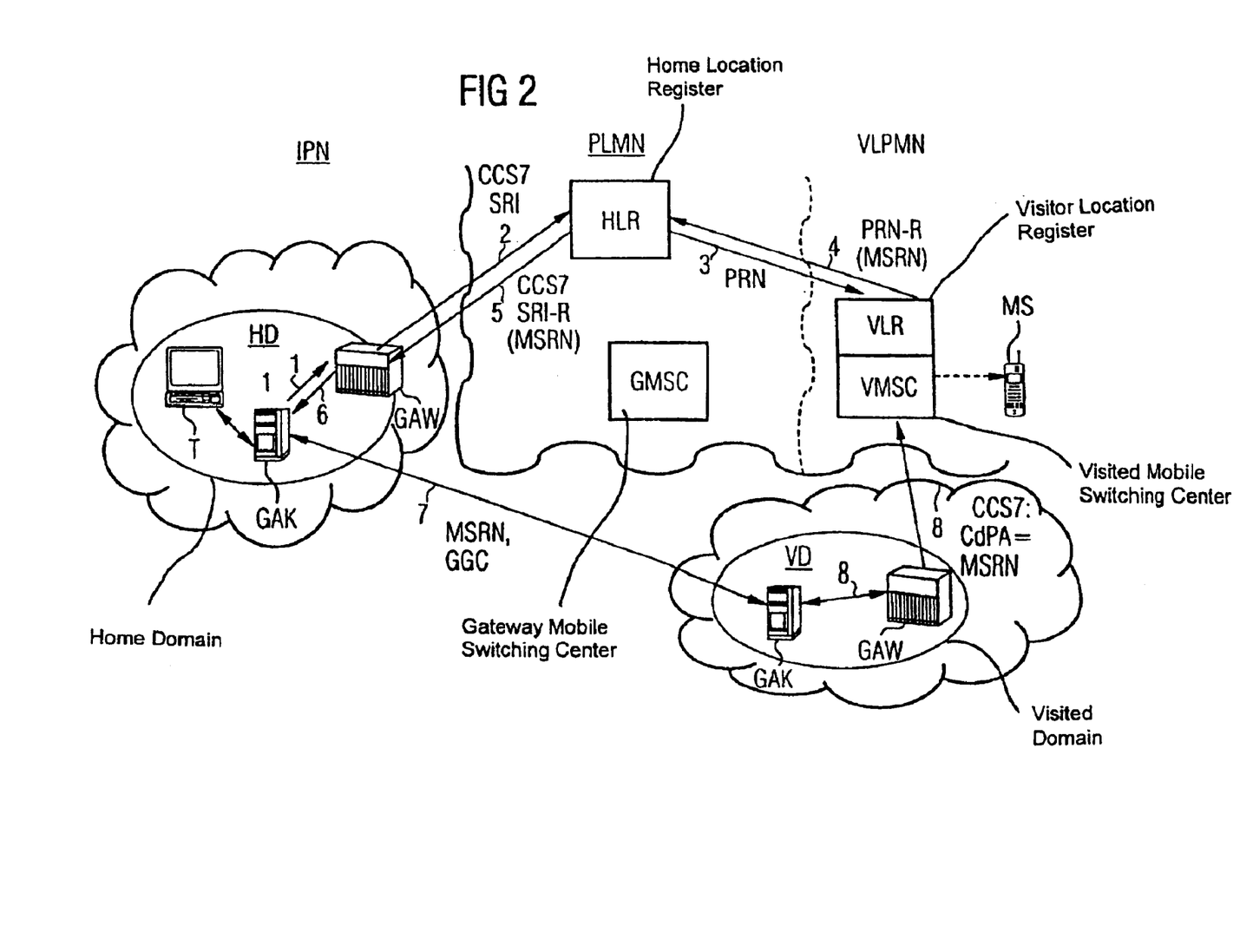
FIG. 2 shows the message flow between the network facilities shown in FIG. 1 for routing the link in the packet-oriented communication network.

FIG. 2 shows the message flow between the network facilities of FIG. 1 for the case where routing of the link through the communication network IP is allowed. The permission for routing depends on a decision which is made either in the mobile radio network PLMN, preferably by the home location register HLR, or in the communication network IPN, preferably by the gatekeeper network facility GAK. The message flow includes a number of steps (1) to (8) which are explained in the text which follows.

(1): The gatekeeper network facility GAK recognizes from the dialed call number that a connection via the terminal T administered in the home domain HD has been initiated by a stationary subscriber—the A party—and is to be set up to a mobile station MS of a mobile subscriber—the B party. In the present example, therefore, the gatekeeper network facility GAK causes the gateway network facility GAW to start the direct interrogation of the mobile radio network PLMN. However, the direct interrogation can also be carried out by the gatekeeper network facility GAK.

(2): The gateway network facility GAW (or the gatekeeper network facility GAK) thereupon sends the message SRI (send routing information), according to the signaling protocol CCS7 supported by the IP network, to the home location register HLR in the home radio network PLMN. For the mobile subscriber or his mobile station MS, which can be identified from an identification also transmitted with the message SRI, the home location register HLR checks in which visited location register VLR he is currently registered, i.e. in which radio zone he is located.

(3), (4): The home location register HLR sends a message PRN (provide roaming number) to the visited location register VLR and receives as a response a message PRN-R (provide roaming number response) which contains a mobile station roaming number MSRN for setting up the connection to the B party or, respectively, to his mobile station MS.

(5): In the case where the mobile subscriber roaming number MSRN is transmitted and no other information which would not allow routing in the IP network (see message flow in FIG. 3), the home location register HLR sends this mobile subscriber roaming number MSRN in a message SRI-R (send routing information response), in accordance with the signaling protocol CCS7 supported by the IP network, back to the requesting gateway network facility GAW (or gatekeeper network facility GAK) of the communication network IPN.

(6): The information received by the gateway network facility GAW is passed through to the gatekeeper network facility GAK. From the evaluation of the information, the latter recognizes that this is a mobile subscriber roaming number MSRN and decides to carry out the routing of the link in the communication network IPN.

As an alternative to steps (5) and (6), the home location register HLR itself, based on the interrogation by the message SRI, can make the decision as to whether the routing of the link initially stays in the communication network IPN or is performed in the mobile radio network PLMN. In this case, the home location register HLR responds to the interrogation by sending back at least one information item to the gatekeeper network facility GAK of the communication network IPN, and this information item indicates the decision that was made. An additional parameter (e.g. routing allowed/not allowed) used as the information item for identifying the type of routing is preferably accommodated in the signaling protocol CCS7.

It is also possible to transmit an error flag to say that the routing is going to be performed in the mobile radio network PLMN instead of a parameter with negative information (e.g. routing not allowed).

(7): The mobile subscriber roaming number MSRN signals to the gatekeeper network facility GAK of the home domain HD, the radio zone of the mobile radio network into which the final routing is to be carried out. Using domain information for identifying the individual domains, the gatekeeper network facility GAK correlates the mobile subscriber roaming number MSRN with the visited domain VD which is located in the vicinity of the radio zone and sets up the link to the gatekeeper network facility GAK of the visited zone VD in accordance with the H.323 standard. This gatekeeper network facility GAK is informed of the mobile subscriber roaming number MSRN. A communication between the two gatekeeper network facilities GAK, which is designated by GGC (gatekeeper gatekeeper communication) in FIG. 2, can be performed according to the H.323 standard.

(8): The gatekeeper network facility GAK of the visited domain VD recognizes from the incoming mobile subscriber roaming number MSRN that the connection has to be routed into the mobile radio network VLPMN and causes the gateway network facility GAW to send a connection set-up message to the visited mobile switching center VMSC in the visited mobile radio network VPLMN. This message is in accordance with the signaling protocol CCS7 and has a called party address CdPA of the B party which consists of the mobile subscriber roaming number MSRN. The signaling protocol CCS7 used is either the ISUP user part or the DSS.1 signaling system.

Finally, the visited mobile switching center VMSC sets up the connection to the mobile station MS of the mobile B party via the base station system in accordance with the known GSM method for mobile terminated calls.

On the basis of the above procedure, it is possible to store additional information in the home location register HLR as to whether routing through the communication network IPN—between home domain HD and visited domain VD—into the current radio zone of the mobile station MS, i.e. into the visited mobile radio network VPLMN in the present example, is generally allowed from the point of view of the home mobile radio network PLMN. A parameter which can be stored in the home location register HLR or externally in an IP roaming table is used for this additional check in the decision on the type of routing.

An example of a criterion in which the routing in the communication network IPN is not allowed occurs when there is no relation between the operator of the home domain HD and its network facilities GAK, GAW and possible visited domains VD and their network facilities GAK, GAW, i.e. the connection would be conducted via a gateway network facility GAW which could not be controlled. A further example for avoiding IP routing is given if the charging would be more disadvantageous via the IPN network to the VPLMN network than via the PLMN network.

As an alternative to the above method, operator information about the operators of the domains—for example about the operator of the home domain HD—can also be transmitted in the message of the direct inquiry by the gatekeeper network facility GAK to the home location register HLR. The home location register HLR transmits this operator information to the visited location register VLR. The visited location register VLR can use this information and operator information about operators of visited domains which in each case provide access from the communication network IPN to the radio zone of the visited mobile radio network VPLMN to influence the further control of the routing of the link. For this purpose, it stores and evaluates a list of the domain operators to which the mobile radio network VPLMN allows access. The result of the check can be, for example:

The costs for routing the link via the IPN network with a transition between two domain operators are more expensive than direct routing via the mobile radio network PLMN or, respectively, VPLMN; or There is no trusted relationship between the domain operators. These relationships can be stored in the register.

As described above, the visited location register VLR can correspondingly send back a parameter (IP routing allowed/not allowed) or an error message by means of which the further connection set-up is controlled. This may require an extension to the existing MAP protocol.

Independently of whether the operator information is sent to the visited location register VLR and processed there as in the above method, the visited location register VLR can send back a list of the operators which are allowed access by the visited mobile radio network VPLMN. This information can also be processed in the home location register HLR. In addition, the home location register HLR can send the operator information to the interrogating domain operator which can then perform the routing in the IPN network via correspondingly selected domain operators on the basis of the list, if the further routing in the IPN network is allowed by the mobile radio network PLMN (see the basic method according to the invention).

The functionalities shown in the examples have been described with reference to the GSM network. For the interrogation of the home location register HLR, the CCS7 or MAP signaling protocol has been described as an example. The method according to the invention can also be applied for other protocols in which there are database access operations such as, for example, IS-41, CAP (CAMEL application PART) etc., and/or for analogous functions in other mobile radio networks such as, for example, the future UMTS (universal mobile telecommunication systems) network.

Figure 3:
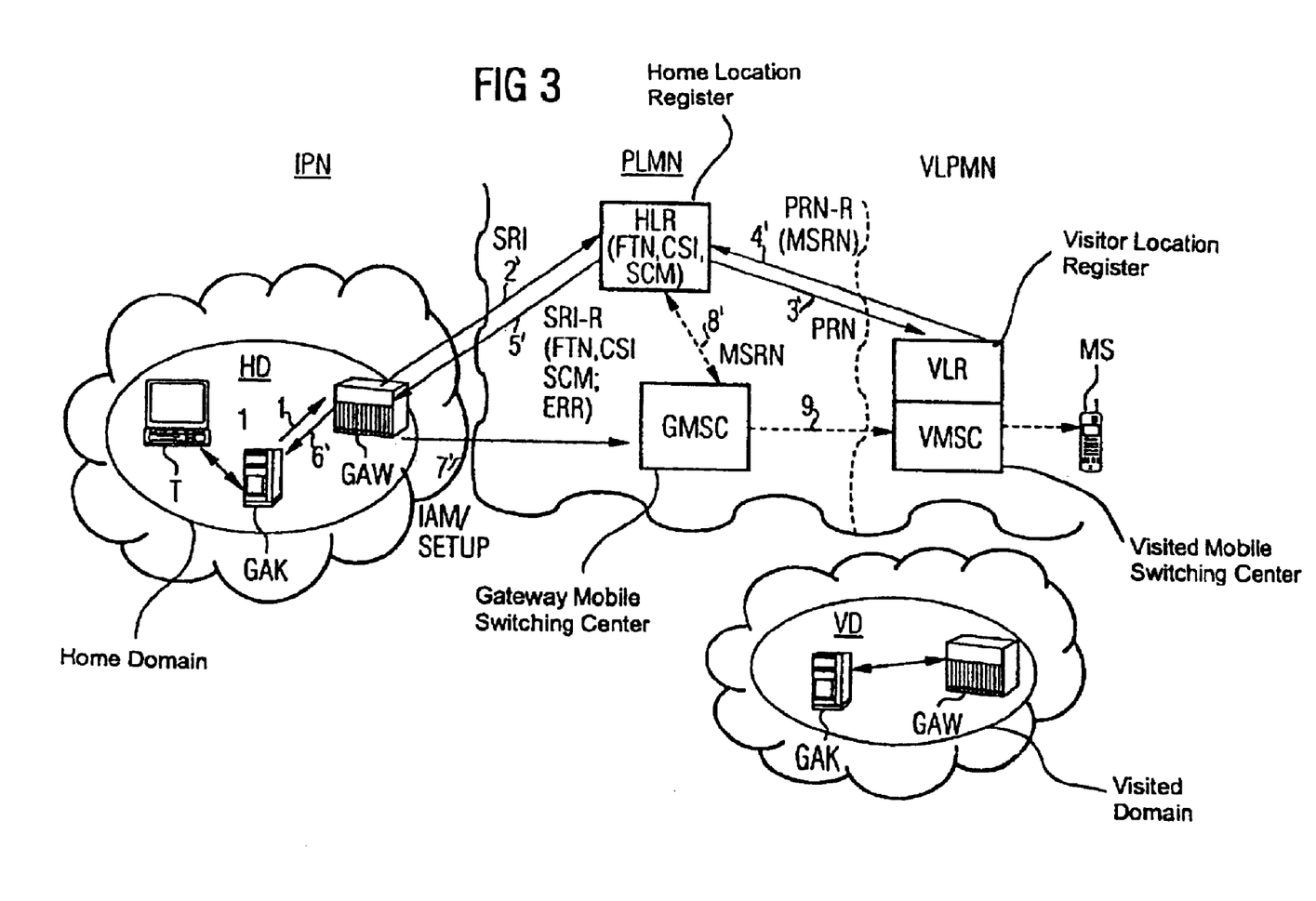
FIG. 3 shows the message flow between the network facilities shown in FIG. 1 for routing the link in the mobile radio network.

FIG. 3 shows the message flow between the network facilities of FIG. 1 in the case where the routing of the connection is only allowed through the mobile radio network PLMN but not through the communication network IPN. Permission for routing depends on a decision which is made either in the mobile radio network PLMN, preferably by the home location register HLR, or in the communication network IPN, preferably by the gatekeeper network facility GAK. The method flow includes a number of steps (1) to (9) which are explained in the text which follows.

(1): The gatekeeper network facility GAK recognizes from the dialed call number that a connection via the terminal T administered in the home domain HD has been initiated by a stationary subscriber—the A party—and is to be set up to a mobile station MS of a mobile subscriber—the B party. In the present example, therefore, the gatekeeper network facility GAK causes the gateway network facility GAW to start the direct interrogation of the mobile radio network PLMN. However, the direct interrogation can also be carried out by the gatekeeper network facility GAK.

(2'): The gateway network facility GAW (or the gatekeeper network facility GAK) thereupon sends the message SRI (send routing information) according to the signaling protocol CCS7 supported by the IP network to the home location register HLR in the mobile radio network PLMN. For the mobile subscriber or his mobile station MS, which can be identified from an identification also transmitted with the message SRI, the home location register HLR checks in which visited location register VLR he is currently registered, i.e. in which radio zone he is located. If the dialed call number is not allocated to any mobile subscriber, for example, the home location register HLR delivers an error flag ERR (error)—see step (5') below. The connection must be set up in the mobile radio network PLMN since it can be another type of call number such as, for example, PBX number, mailbox number, special number, service number etc. Aborting the connection set-up is not appropriate but routing is carried out via the mobile switching center GMSC—see step (7') below.

(3'), (4'): if the call number can be allocated to a mobile subscriber, the home location register HLR sends a message PRN (provide roaming number) to the visited location register VLR. It receives as a response a message PNR-R (provide roaming number response) which can but does not need to contain a mobile subscriber roaming number MSRN. If, in addition to the mobile subscriber roaming number MSRN or instead of the mobile subscriber roaming number MSRN, one or more information items are present which would not allow routing in the IP network, the connection is set up differently from that in FIG. 2. These information items are, for example, FTN (forwarded to number), CSI (CAMEL service indication), SCM (service class mark) etc., which are stored in the home location register HLR and concern the connection set-up to the B party or to his mobile station MS, respectively.

The FTN information relates to call forwarding set up for the mobile subscriber and identifies the call party number of the diversion. If it is, for example, a conditional call forwarding set for the B party, the FTN information is stored by the visited location register VLR and transmitted. Since the type of the FTN call party number—e.g. mailbox, fixed network number, mobile number etc.—is not known in the communication network IPN and there could be interactions between features of different networks, the routing is carried out via the mobile switching center GMSC—see step (7') below—of the addressed mobile radio network PLMN.

The CSI information relates to interworking of the mobile subscriber with a CAMEL/IN (customized application mobile enhanced logic/intelligent network) service in which the connection is controlled via corresponding CAP/INAP protocols. The knowledge for this does not exist in the communication network IPN so that routing is performed via the mobile switching center GMSC—see step (7') below—of the addressed mobile radio network PLMN.

The SCM information relates to the use of an IN-based mobile radio network operator-related supplementary service which is not replicated in the communication network IPN. Routing is, therefore, carried out via the mobile switching center GMSC—see step (7') below—of the addressed mobile radio network PLMN also for this case.

(5'): In the case where information deviating from the mobile subscriber roaming number MSRN—see FIG. 2—or additional other information items (see message flow in FIG. 3) are present, the home location register HLR sends this FTN, CSI, SCM information, according to the signaling protocol CCS7 supported by the IP network, in a message SRI-R (send routing information response) back to the requesting gateway network facility GAW of the communication network IPN. The ERR error flag can also be contained in the response message SRI-R.

(6'): The information received by the gateway network facility GAW is passed through to the gatekeeper network facility GAK. From the evaluation of the information, the latter recognizes that this is not the mobile subscriber roaming number but at least one information item which differs from that, and decides not to carry out the routing of the link in the communication network IPN.

As an alternative to steps (5') and (6'), the home location register HLR itself can make the decision as to whether the routing of the link initially stays in the communication network IPN or is performed into the mobile radio network PLMN on the basis of the interrogation by means of the message SRI. In this case, it responds to the inquiry by sending back at least one information item to the gatekeeper network facility GAK of the communication network IPN which indicates the decision that has been made. As the information item an additional parameter (e.g. routing allowed/not allowed) for identifying the type of routing is preferably accommodated in the signaling protocol CCS7. It is also possible to transmit an error flag to say that the routing is performed in the mobile radio network PLMN instead of a parameter with negative information (e.g. routing not allowed).

(7'), (8'): Due to the reception of one of the exemplary information items FTN, CSI, SCM by the home location register HLR, the gatekeeper network facility GAK routes the link directly, or via the gateway network facility GAW or via another gateway network facility GAW, to the mobile switching center GMSC of the addressed mobile radio network PLMN. In this process, the gatekeeper network facility GAK or, respectively, GAW uses an initial address message IM according to the ISUP user part or a SETUP initialization message according to the DSS.1 signaling system. The called party address of the B party is also sent. In the mobile radio network PLMN, the interrogation of the home location register HLR and the interrogation of the visited location register VLR for the mobile subscriber roaming number MSRN is performed again in accordance with the usual connection set-up in the case of a mobile terminated call.

(9): After receiving the mobile subscriber roaming number MSRN, the mobile switching center GMSC of the addressed mobile radio network PLMN routes the link to the mobile switching center VMSC which is responsible for the mobile subscriber or, respectively, his mobile station MS in the visited mobile radio network VPLMN. Finally, the mobile switching center VMSC sets up the connection to the mobile station MS of the mobile B party via the base station system in accordance with the known GSM method for mobile terminated calls.

We claim:

1. A method for routing links through a packet-oriented communication network, and for communicating with a mobile radio network, the method which comprises:
providing a mobile radio network that includes at least one home location register for administering mobile stations of mobile subscribers and that uses a signaling protocol for communication between network facilities of the mobile radio network;
providing a packet-oriented communication network that includes at least one domain having at least one network facility for administering communication terminals in the at least one domain;
enabling the at least one network facility of the packet-oriented communication network to support the signaling protocol for interworking with the home location register of the mobile radio network; and
with the network facility of the packet-oriented communication network, using the signaling protocol to direct an inquiry to the home location register of the mobile radio network as to whether a routing of a link is to be performed in the packet-oriented communication network or in the mobile radio network.

2. The method according to claim 1, which comprises:
with the home location register of the mobile radio network, answering the inquiry by sending at least one information item to the packet-oriented communication network; and
with the network facility of the packet-oriented communication network, using the information item to decide whether the routing of the link will be performed in the packet-oriented communication network.

3. The method according to claim 2, which comprises:
providing the information item with a mobile subscriber roaming number issued for one of the mobile stations of one of the mobile subscribers;
routing the link in the packet-oriented communication network from a domain into the mobile radio network;
after the routing of the link in the packet-oriented communication network, performing the step of answering the inquiry by sending the information item to the packet-oriented communication network; and using the information item for setting up a connection to the one of the mobile stations.

4. The method according to claim 2, which comprises:
providing the packet-oriented communication network with a visited domain and a home domain;
initiating the link and the inquiry from the home domain;
routing the link between the home domain and the visited domain; and
establishing a connection from the visited domain into the mobile radio network because of a vicinity of the visited domain to a radio zone covering one of the mobile stations.

5. The method according to claim 1, which comprises:
with the home location register, answering the inquiry by sending at least one information item to the packet-oriented communication network; and
with the network facility, using the information item to decide that the routing of the link will be carried out in the mobile radio network.

6. The method according to claim 5, which comprises selecting the information from the group consisting of a mobile radio network-oriented information item and an error flag.

7. The method according to claim 1, which comprises:
with the home location register, deciding based on the inquiry, whether the routing of the link is to be performed in the packet-oriented communication network or in the mobile radio network; and
with the home location register, answering the inquiry by sending at least one information item to the packet-oriented communication network that signals the decision to the network facility.

8. The method according to claim 7, wherein the information item is sent by performing an operation selected from the group consisting of:
including an additional parameter in the signaling protocol for identifying a type of routing; and
transmitting an error flag for identifying the routing in the mobile radio network.

9. The method according to claim 7, which comprises:
providing the packet-oriented communication network with a visited domain and a home domain;
providing the visited domain in a vicinity of a radio zone currently covering one of the mobile stations such that a connection can be established into the mobile radio network;
initiating the link and the inquiry from the home domain; and
checking the decision regarding the performance of the routing of the link to determine whether the routing of the link is allowed within the packet-oriented communication network between the home domain and the visited domain.

10. The method according to claim 9, which comprises performing the checking step by evaluating, in the mobile radio network, a parameter that identifies a possibility of routing between the home domain and the visited domain.

11. The method according to claim 10, which comprises storing the parameter in a location selected from the group consisting of the home location register and a table containing information regarding domains that can be used for the routing.

12. The method according to claim 7, which comprises:
providing the mobile radio network with a further visited location register that belongs to a radio zone of the mobile radio network that is currently covering one of the mobile stations;

providing the packet-oriented communication network with a home domain having an operator;

initiating the link and the inquiry from the home domain;

in the inquiry to the home location register of the mobile radio network, including operator information item about the operator of the home domain of the packet-oriented communication network;

transmitting the operator information item from the home location register of the mobile radio network to the further visited location register; arid for further control of the routing of the link, using the further visited location register to evaluate the operator information item and operator information regarding operators of visited domains that can provide access from the packet-oriented communication network to the radio zone of the mobile radio network.

13. The method according to claim 12, which comprises:

storing the operator information regarding operators of visited domains;

with the further visited location register, using the stored operator information and the operator information item to check whether there is a possibility of routing between the home domain of the packet-oriented communication network and the visited domain of the packet-oriented communication network; and to obtain a decision regarding a type of routing, sending a corresponding information item to the home location register in dependence upon the result of the check.

14. The method according to claim 7, which comprises:

providing the mobile radio network with a further visited location register that belongs to a radio zone of the mobile radio network that is currently covering one of the mobile stations;

in the further visited location register, storing operator information about operators of visited domains that can provide access from the packet-oriented communication network to the radio zone of the mobile radio network;

providing the operator information to the home location register; and evaluating the operator information for further control of the routing of the link in a network selected from the group consisting of the mobile radio network and the packet-oriented communication network.

15. The method according to claim 14, which comprises:

providing the packet-oriented communication network with a visited domain and a home domain;

with the home location register, using the operator information to check whether there is a possibility of routing between the home domain of the packet-oriented communication network and the visited domain of the packet-oriented communication network; and to obtain a decision regarding a type of routing, sending a corresponding information item to the home location register in dependence upon the result of the check.

16. The method according to claim 14, which comprises:

providing the packet-oriented communication network with a visited domain and a home domain;

initiating the link and the inquiry from the home domain;

transmitting the operator information from the home location register into the packet-oriented communication network;

using the operator information to check whether there is a possibility of routing between the home domain and the visited domain; and carrying out the routing of the link in dependence on a result of the check.

* * * * *